US010635462B2

(12) United States Patent
Vangala et al.

(10) Patent No.: US 10,635,462 B2
(45) Date of Patent: Apr. 28, 2020

(54) SKILL DISCOVERY FOR COMPUTERIZED PERSONAL ASSISTANT

(71) Applicant: Microsoft Technology Licensing, LLC, Redmond, WA (US)

(72) Inventors: Vipindeep Vangala, Hyderabad (IN); Swati Valecha, Hyderabad (IN); Suryanarayana Shastri, Hyderabad (IN); Nitin Pande, Hyderabad (IN); Tulasi Menon, Hyderabad (IN); Madan Gopal Jhanwar, Hyderabad (IN); Nishchay Kumar, Hyderabad (IN)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 18 days.

(21) Appl. No.: 15/987,837

(22) Filed: May 23, 2018

(65) Prior Publication Data

US 2019/0361719 A1    Nov. 28, 2019

(51) Int. Cl.
*G06F 3/00* (2006.01)
*G06F 9/451* (2018.01)
(Continued)

(52) U.S. Cl.
CPC .............. *G06F 9/453* (2018.02); *G06F 3/167* (2013.01); *G06F 16/243* (2019.01); *G06F 16/24578* (2019.01)

(58) Field of Classification Search
CPC ........... G06F 16/9535; G06F 16/24575; G06F 16/24578; G06F 16/9024; G06F 16/951;
(Continued)

(56) References Cited

U.S. PATENT DOCUMENTS 8,180,583 B1    5/2012  Gossweiler et al.
2013/0110520 A1*  5/2013  Cheyer ................... G10L 15/22
704/275
(Continued)

FOREIGN PATENT DOCUMENTS

WO    2015094891 A1    6/2015
WO    2016122902 A2    8/2016

OTHER PUBLICATIONS

Kinsella, Bret, "Amazon Alexa Skill Discovery Now Offering Autosuggestions in Search" Nov. 10, 2017. 5 pages. Available at: https://www.voicebot.ai/2017/11/10/amazon-alexa-skill-discovery-now-offering-autosuggestions-search/.
(Continued)

*Primary Examiner* — Di Xiao
(74) *Attorney, Agent, or Firm* — Alleman Hall Creasman & Tuttle LLP

(57) ABSTRACT

A computerized personal assistant communicatively couples to a computer database including a plurality of available skills for the computerized personal assistant. The computerized personal assistant recognizes a current context of the user. The computerized personal assistant operates a previously-trained machine learning classifier to assess a match confidence for a candidate skill, the match confidence indicating a quality of match between the current context and a reference context previously associated with the candidate skill. The computerized personal assistant executes instructions defining an assistive action associated with the candidate skill responsive to the match confidence exceeding a predefined match confidence threshold. The computerized personal assistant executes the instructions defining a complementary help action associated with the candidate skill responsive to the match confidence not exceeding the predefined match confidence threshold.

20 Claims, 5 Drawing Sheets

(51) Int. Cl.
  *G06F 16/242* (2019.01)
  *G06F 16/2457* (2019.01)
  *G06F 3/16* (2006.01)

(58) Field of Classification Search
  CPC ............ G06F 16/90335; G06F 21/577; G06F 2221/2113; G06F 16/243; G06F 21/55; G06F 21/552; G06F 2221/2101; G06F 2221/2119; G06F 16/24534; G06F 16/2457; G06F 16/2423; G06F 16/3346; G06F 16/90324; G06F 21/6263; G06F 2221/2141; G06F 16/248; G06F 16/285; G06F 21/32; G06F 16/00; G06F 16/2452; G06F 16/2453; G06F 16/3322; G06F 16/583; G06F 16/5838; G06F 16/9032; G06F 16/95; G06F 17/277; G06F 17/2785; G06F 19/3468; G06F 11/0709; G06F 11/0769; G06F 11/0781; G06F 12/0888; G06F 12/123; G06F 12/126; G06F 16/212; G06F 16/2358; G06F 16/2425; G06F 16/245; G06F 16/2455; G06F 16/335; G06F 16/907; G06F 16/93; G06F 16/9536; G06F 16/9537; G06F 16/954; G06F 16/957; G06F 19/321; G06F 21/316; G06F 21/34; G06F 21/554; G06F 21/6245; G06F 3/0412; G06F 3/0416; G06F 3/04886; G06F 9/5038

See application file for complete search history.

(56) References Cited

U.S. PATENT DOCUMENTS

2014/0365226 A1   12/2014  Sinha
2019/0164193 A1*  5/2019   Drake ................ G06Q 30/0256

OTHER PUBLICATIONS

"International Search Report and Written Opinion Issued in PCT Application No. PCT/US19/032070", dated Dec. 17, 2019, 17 Pages.

\* cited by examiner

SKILL DISCOVERY FOR COMPUTERIZED PERSONAL ASSISTANT

BACKGROUND

Computerized personal assistants may provide a variety of different skills configured to perform tasks to assist a user. However, the user may not be aware of the different skills available, or the user may not be aware of how to use a particular skill.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computerized personal assistant communicatively couples to a computer database including a plurality of available skills executable by the computerized personal assistant. The computerized personal assistant is configured to recognize a current context of the user and operate a previously-trained machine learning classifier to assess a match confidence for the candidate skill. The match confidence indicates a quality of match between the current context and a reference context previously associated with the candidate skill. The computerized personal assistant is configured to execute an assistive action associated with the candidate skill responsive to the match confidence exceeding a predefined match confidence threshold. The computerized personal assistant is configured to execute a complementary help action associated with the candidate skill responsive to the match confidence not exceeding the predefined match confidence threshold.

DETAILED DESCRIPTION

Figure 1:
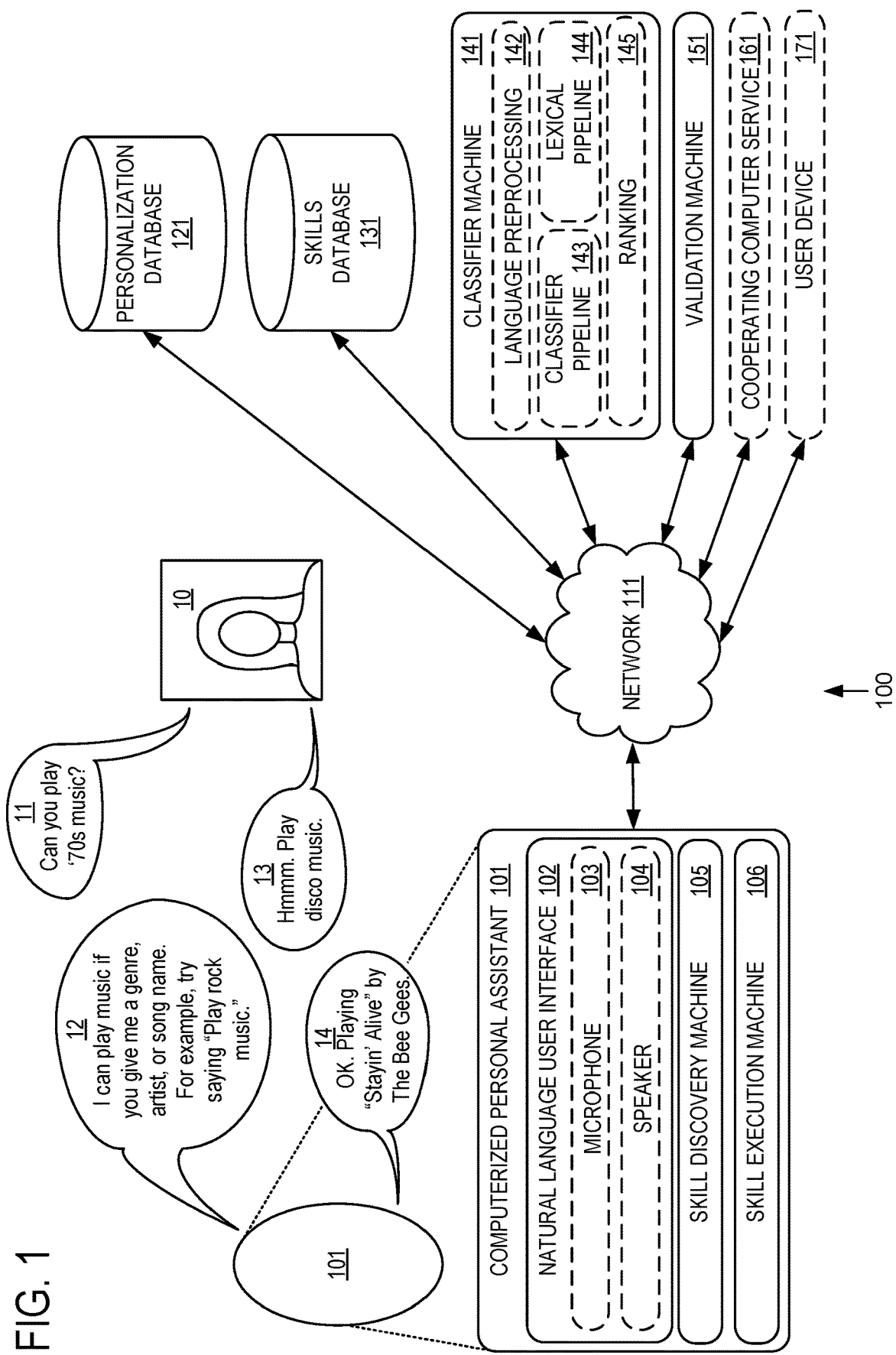
FIG. 1 shows an exemplary computing environment including a computerized personal assistant configured to facilitate discovery of its skills.

A computerized personal assistant may be configured to use a variety of different skills to serve natural language queries submitted by a user (e.g., via a natural language user interface (NLUI) configured to receive audio and/or textual natural language queries).

As used herein, "skill" includes any operation or set of related operations which may be performed by a computerized personal assistant to assist a user. Non-limiting examples of assistance that may be provided by a skill include 1) gathering and outputting information and/or multimedia content (e.g., automatically searching a multimedia streaming service for streaming content); 2) recording information for later retrieval (e.g., memos, notes, to-do lists, commitments); 3) communicating with other users (e.g., by sending an email or other message); 4) controlling electrical and/or mechanical appliances (e.g., automatically controlling a home thermostat); and/or 5) interacting with a cooperating computer service or device (e.g., preparing content to be displayed at a user device such as a mobile phone).

In some examples, using a skill may include communicatively coupling the computerized personal assistant to a cooperating computer service in order to cause the cooperating computer service to perform at least part of the operation to assist the user. For example, using a skill may include communicatively coupling to a cooperating computer service having an associated application programming interface (API), and automatically invoking the API to assist the user. More generally, a skill may be configured to invoke one or more APIs in any suitable manner to assist the user. Non-limiting examples of APIs include 1) APIs for purchasing goods and/or services (e.g., API for scheduling a ride, API for ordering food for delivery); 2) APIs for subscription multimedia content (e.g., API for logging into a streaming video service and retrieving licensed video content); 3) APIs for gathering information (e.g., API for retrieving directions from a map service); 4) APIs for performing calculations and/or transforming data; 5) APIs for storing and/or retrieving user data (e.g., API for collaborative document editing, API for sharing photographs); and/or 6) APIs for interacting with specific hardware devices and/or cooperating computer services (e.g., APIs for using sensor data collected at a user device such as a mobile phone). Skills configured to invoke a plurality of APIs may provide assistance for any suitable task(s) using the APIs.

A computerized personal assistant may be configured to use a wide variety of different skills. However, a user of the computerized personal assistant may not know what skills are available and/or how to use available skills. As such, when the user wants to perform a task, although they may wish to receive assistance from the computerized personal assistant, they may not know if the computerized personal assistant is capable of providing assistance. Even if the user suspects that the computerized personal assistant is configured to help, the user may not know an appropriate query that would cause the computerized personal assistant to provide the desired assistance. As used herein, "query" includes any utterance (e.g., questions, verbal commands, non-verbal-commands, and/or spoken or written words, phrases, and/or sentences) which may be processed by a computerized personal assistant in order to determine how to assist the user (e.g., what skill to utilize to assist the user). Utterances include audible speech as well as any other actions by a user signifying lexical content, e.g., typing text and/or symbols, inking handwritten text and/or symbols, and/or gestures. Similarly, "conversation" is used herein to refer to a spoken and/or textual exchange between a user and a computerized personal assistant.

Even when a user has previously engaged in conversation with a computerized personal assistant and thereby become familiar with some of the skills of the computerized personal assistant, the user may be unfamiliar with other skills of the computerized personal assistant. In some examples, the computerized personal assistant may be updated to provide new skills not previously seen by users of the computerized personal assistant. In some examples, the computerized personal assistant may provide skills that pertain to a domain-specific task that a user is unlikely to engage in frequently, or skills that pertain to a task the user has never previously attempted to complete with the assistance of the computerized personal assistant. As a result, a user of the computerized personal assistant may not become familiar with a skill of the computerized personal assistant, and may be unable to pose appropriate queries to complete a task using the skill.

Accordingly, FIG. 1 shows a computing environment 100 including a computerized personal assistant 101 that is configured to facilitate the discovery of skills by a user 10 through conversation with the user 10. Computerized personal assistant 101 is communicatively coupled, via a computer network 111, to a personalization database 121, a skills database 131, a classifier machine 141, a validation machine 151, and optionally further communicatively coupled to a cooperating computer service 161 and/or to a user device 171. Computer network 111 may be any suitable computer network, e.g., the Internet. Cooperating computer service 161 may be any suitable computer service, e.g., a provider of an API. User device 171 may be any suitable computing device of user 10, e.g., a personal computer or a mobile phone.

Facilitating discovery of skills by a user 10 through conversation with the user 10 may improve an efficiency and/or performance of computerized personal assistant 101 aiding user 10 in the completion of various tasks. For example, when relevant skills are discovered through conversation, user 10 may efficiently learn about how to cause computerized personal assistant 101 to provide assistance with a task by simply asking a question about the task, without needing to divert attention from the task. Furthermore, facilitating discovery of skills through conversation may allow user 10 to learn about a skill that is particularly well suited to a task. For example, computerized personal assistant 101 may help user 10 to discover a skill that will achieve particularly good performance when completing a task, in terms of computational efficiency (e.g., processor load and/or network bandwidth usage), user satisfaction, elapsed time to complete the task, monetary costs to complete the task, and/or any other suitable considerations of performance for completion of tasks by computerized personal assistant 101.

Furthermore, computerized personal assistant 101 may ensure, through conversation with user 10, that all relevant information for completing a task is collected prior to engaging a skill. Accordingly, computerized personal assistant 101 may defer engaging skills until sufficient information is collected to engage a pertinent skill that is likely to succeed in assisting user 10 with completing the task. Similarly, by facilitating discovery of pertinent skills and collecting relevant information before engaging skills, computerized personal assistant 101 may avoid engaging skills that are unlikely to succeed in assisting user 10 with completing the task. Accordingly, computerized personal assistant 101 may increase a computational efficiency and/or reduce a cost of completing tasks (e.g., by reducing processor load and/or network bandwidth usage).

Computerized personal assistant 101 includes a NLUI 102 configured to receive queries. Optionally, in some examples, NLUI 102 may include a microphone 103 configured to capture speech audio. Accordingly, the queries received by NLUI 102 may include the speech audio captured by the microphone. In some examples, NLUI 102 is configured to receive user speech audio and to represent the user speech audio as text.

Alternately or additionally, NLUI 102 may include a keyboard or any other text input device configured to receive a query in the form of text. In some examples, NLUI 102 may include an inking input device and the user input received by NLUI 102 may include user handwriting and/or user gestures captured by the inking input device. As used herein, "inking input device" includes any device or combination of devices which may allow a user to provide inking input. For example, an inking input device may include any device which allows the user to indicate a series of two- or three-dimensional positions relative to a display or any other surface, e.g., 1) a capacitive touch screen controlled by a user's finger; 2) a capacitive touch screen controlled by a stylus; 3) a "hover" device including a stylus and a touch screen configured to detect a position of the stylus when the stylus is in proximity to the touch screen; 4) a mouse; or 5) a video game controller. In some examples, an inking input device may alternately or additionally include a camera configured to detect user gestures. For example, a camera may be configured to detect gestures based on three-dimensional movements of the user's hand. Alternately or additionally, a camera (e.g., a depth camera) may be configured to detect movements of the user's hand as two-dimensional positions relative to a surface or plane, e.g., relative to a plane defined by a front side of a viewing frustum of the camera.

Optionally, in some examples, NLUI 102 may include a speaker 104 configured to output responses to queries in the form of speech audio. Alternately or additionally, NLUI 102 may include a display configured to display responses to queries in the form of text. Alternately or additionally, NLUI 102 may be configured to send responses, via network 111, to a user device 171 (e.g., a mobile phone) in order to output speech audio via a speaker of user device 171 and/or to display response text at a display of user device 171. Alternately or additionally, NLUI 102 may be configured to send any suitable notification to user 10 (e.g., via any suitable messaging protocol, via visible lights, via displayed symbols, text, and/or images, and/or via audible sounds and/or synthesized speech).

Computerized personal assistant 101 includes a skill discovery machine 105. Skill discovery machine 105 is configured to facilitate discovery of skills to assist user 10. Skill discovery machine 105 may facilitate discovery of a skill based on a query received at NLUI 102 of computerized personal assistant 101 and/or based on a current context of user 10.

Skill discovery machine 105 is configured to assess a match confidence for a candidate skill, the match confidence indicating a quality of match between a current context and a reference context previously associated with the candidate skill. In some examples, the reference context may include a seed query defined by an exemplary natural language sentence. In some examples, a reference context comprises a historical activity context including state data of a computer service (e.g., cooperating computer service 161), wherein the state data is associated with a recognized activity that was engaged in in by a historical user of the computer service, and wherein the operation to assist the user pertains to the recognized activity.

In some examples, skill discovery machine 105 is configured to communicatively couple to skills database 131 and/or classifier machine 141 to select a skill from skills database 131 based on the current context of user 10, in order to facilitate the discovery of the candidate skill. Selecting a candidate skill from skills database 131 is based on assessing a match confidence for the candidate skill, the match confidence indicating a quality of match between the current context and a reference context previously associated with the candidate skill.

As used herein, "context" includes any information relating to user 10 which is available to computerized personal assistant 101 and which may pertain to a current activity of user 10. Non-limiting examples of such context information include: 1) a history of interaction between user 10 and computerized personal assistant 101 (e.g., past queries) and/or interaction between user 10 and cooperating computer service 161; 2) a current state of cooperating computer service 161; 3) a current state of user device 171 (e.g., based on sensor data captured by a sensor of user device 171 or based on an application program executing on user device 171); 4) stored commitments, appointments, communications, or other logistical information input by the user 10 and/or received from other users at cooperating computer service 161 and/or user device 171; 5) stored preferences of user 10, 6) queries received at NLUI 102, and/or 7) current audio or video observations of the user. In some examples, a context of a user is determined based on recognizing natural language features of a query received at NLUI 102 in order to identify one or more of an intent expressed by the query and/or a constraint defined by the query. In some examples, a context of a user is determined based on recognizing an intent of the user based on a current and/or past activity of the user, e.g., based on state data of an application program executing on user device 171 or state data of cooperating computer service 161.

As used herein, "intent" includes any outcome intended by the user, e.g., a goal the user would like to be fulfilled by a response to a query, or a task the user is performing using a cooperating computer service. "Constraint" includes any detail specified by a context, e.g., an entity mentioned in the query, an event mentioned in the query, an entity indicated by state data of cooperating computer service 161, or any other suitable details (e.g., time/date/location details). Computerized personal assistant 101, using NLUI 102, may recognize an intent of a context, e.g., an intent of a query or an intended task a user may be engaged in based on a state of a cooperating computer service 161. For example, if user 10 asks computerized personal assistant 101 to "play disco music," computerized personal assistant 101 may recognize an intent to play music, and a constraint that the genre of the music should be disco. In some examples, computerized personal assistant 101 may recognize one or more predefined constraints that should be associated with a received query based on an intent of the query. For example, when an intent of a query is to play music, computerized personal assistant 101 may recognize that one or more of the "genre," "song," and/or "artist" constraints should be specified in order to play music.

Personalization database 121 may store one or more current contexts of user 10. For example, responsive to interaction with user 10, computerized personal assistant 101, cooperating computer service 161, and/or user device 171 may communicatively couple to personalization database 121 in order to store relevant data in personalization database 121. In some examples, personalization database 121 may be a component of computerized personal assistant 101. For example, a storage device of computerized personal assistant 101 may store personalization data and make such personalization data available to provide functionality of personalization database 121. In some examples, computerized personal assistant 101 may communicatively couple to personalization database 121 in order to access personalization data stored in personalization database 121. Accordingly, computerized personal assistant 101 may retrieve a current context of user 10, in order to facilitate discovery of a skill based on such context. Alternately or additionally, computerized personal assistant 101, cooperating computer service 161, and/or user device 171 may maintain one or more current contexts of user 10, independently of personalization database 121. Accordingly, computerized personal assistant 101 may facilitate discovery of a skill based on any suitable current context (e.g., any combination of queries received at natural language user interface 102 and/or current contexts maintained by computerized personal assistant 101, personalization database 121, cooperating computer service 161, and/or user device 171).

Computerized personal assistant 101 further includes a skill execution machine 106. Skill execution machine 106 is configured to determine a current query (e.g., by receiving, from the NLUI 102, a current query captured by microphone 103). Skill execution machine 106 is further configured, responsive to receiving the current query, to operate skill discovery machine 105 to assess a match confidence for a candidate skill. In some examples, skill execution machine 106 is configured to operate skill discovery machine 105 with regard to each candidate skill of a plurality of candidate skills, e.g., so as to select a candidate skill having a relatively higher match confidence among the plurality of candidate skills. Accordingly, through the operation of skill discovery machine 105, skill execution machine 106 may select a candidate skill for executing an assistive action and/or complementary help action of the candidate skill. Skill execution machine 106 is further configured to execute instructions defining an assistive action associated with the candidate skill, to perform an operation to assist the user, responsive to the match confidence exceeding a predefined match confidence threshold. Skill execution machine 106 is further configured to execute instructions defining a complementary help action associated with the candidate skill, to output a predefined response to educate the user about the assistive action, responsive to the match confidence not exceeding the predefined match confidence threshold.

Skills database 131 is configured to include a plurality of skills for computerized personal assistant 101. Skills database 131 may include available skills and/or unavailable skills. Computerized personal assistant 101 is configured to perform operations to assist user 10 according to any of the available skills, while computerized personal assistant 101 may need further configuration in order to utilize unavailable skills. For example, skills database 131 may include an unavailable skill that may only be utilized if computerized personal assistant 101 is configured to provide a user credential associated with a user account of a cooperating computer service (e.g., cooperating computer service 161). In an example, an unavailable skill is a skill for playing streaming media content from a streaming media service, and the unavailable skill may only be utilized if computerized personal assistant 101 is configured to log in to the streaming media service using a user account of user 10.

Skills database 131 is configured to define, for a candidate skill of the plurality of skills, an assistive action, a reference context previously associated with the assistive action, and a complementary help action previously associated with the assistive action. An assistive action for a skill is defined by instructions executable by computerized personal assistant 101 to perform an operation to assist a user. For example, an assistive action may include instructions to gather sensor data from computerized personal assistant 101 and/or user device 171, and to invoke one or more APIs based on the gathered sensor data, in order to perform an operation to assist the user using the one or more APIs. A reference context associated with an assistive action may be any suitable context as described above, e.g., a query or a state of a cooperating computer service 161. A complementary help action associated with an assistive action is defined by instructions executable by computerized personal assistant 101 to output a predefined response to educate the user about the assistive action. For example, a complementary help action may be defined by instructions to output a predefined response describing how to use the assistive action. In some examples, the predefined response may be output via speaker 103 of computerized personal assistant 101.

Skills database 131 is configured to allow adding new skills by receiving data defining, for a new skill: instructions executable by computerized personal assistant 101 to perform an assistive action of the new skill, a reference context associated with the assistive action, and instructions executable by computerized personal assistant 101 to perform a complementary help action associated with the assistive action. The instructions to perform the complementary help action may be configured to output a predefined response to educate user 10 about the assistive action. Accordingly, in some examples, defining the complementary help action may be based on supplying the predefined response, and skills database 131 is configured to automatically define instructions to perform the complementary help action based on the supplied predefined response.

Assessing the match confidence based on a current context of user 10 may include operating classifier machine 141 to match the current context to a reference context associated with the candidate skill. In some examples, skill discovery machine 105 is configured to access skills database 131 in order to select an initial plurality of available skills and, for each skill in the plurality of available skills, to operate classifier machine 141 to select a matching skill. In some examples, functionality of skills database 131 and classifier machine 141 may be provided by a single computer service and/or computer device, e.g., skills database 131 and classifier machine 141 may be implemented on a common server. In some examples, skills database 131 and/or classification machine 141 may be a component of computerized personal assistant 101. In some examples, skills database 131 and/or classifier machine 141 are configured to automatically cooperate to automatically select a skill based on a current context. For example, skills database 131 may be configured to receive a current context and to automatically operate classifier machine 141 to select a matching skill and return the matching skill to skill discovery machine 105.

Classifier machine 141 includes a machine learning classifier previously trained to assess, for a candidate skill of the plurality of available skills in skills database 131, a match confidence for the candidate skill indicating a quality of match between the current context of user 10 and a reference context previously associated with the candidate skill.

By matching a current context to a reference context of the candidate skill, classifier machine 141 may thereby assess a relevance of the candidate skill to the current context, e.g., when the current context and the reference context are similar, the candidate skill may be applicable to both contexts. For example, when the current context is based on a current query received at NLUI 102, the reference context may be a similar reference query (e.g., a substantially identical query or a semantically equivalent rephrasing of the current query). Accordingly, the current query and the reference query may express a similar intent and/or define similar constraints, and the candidate skill is likely applicable to the current query as well as the reference query.

Optionally, in some examples, classifier machine 141 is configured to pre-process natural language data of a current context (e.g., natural language data derived from a query, and/or natural language data associated with a state of a cooperating computer service 161) at language preprocessing 142. Language preprocessing 142 may include any suitable preprocessing, e.g., tokenization, dependency and/or constituency parsing, correcting spelling, stemming words and replacing words with synonyms, and/or any other suitable techniques to transform natural language data of the current context into a standardized form (e.g., a parse tree including stemmed, correctly spelled words).

Optionally, in some examples, classifier machine 141 is configured to process a current context (e.g., after pre-processing at language preprocessing 142) via one or both of a classifier pipeline 143 and/or a lexical pipeline 144. In some examples, classifier machine 141 is configured to process the current context at each of classifier pipeline 143 and lexical pipeline 144, independently and substantially in parallel.

Classifier pipeline 143 includes one or more machine learning (ML) and/or artificial intelligence (AI) models previously trained to classify a current context and a reference context in order to assess a match confidence indicating a quality of match between the current context and the reference context. Classifier pipeline 143 may include any suitable ML and/or AI models.

In some examples, classifier pipeline 143 includes a statistical classifier (e.g., support vector machine, logistic regression, or any other suitable statistical classifier). In some examples, classifier pipeline 143 includes a deep neural network model, e.g., deep semantic similarity model (DSSM). More generally, classifier pipeline 143 may include any ML model that may be trained based on training data (e.g., supervised training using labelled examples). Classifier pipeline 143 is configured to recognize a semantic match between the current context and the reference context, even when natural language features of the current context and the reference context differ lexically. In some examples, classifier pipeline 143 may include a plurality of different AI and/or ML models configured as an ensemble model. For example, the ensemble model may be based on any suitable ensemble method, such as bagging and/or boosting (e.g., AdaBoost).

Lexical pipeline 144 is configured to apply one or more rules for assessing a match confidence indicating a quality of match between the current context and the reference context based on lexical content of the current context and the reference context. Lexical pipeline 144 is configured to detect lexical features associated with the current context and/or reference context (e.g., lexical features of a query or lexical features of a natural language feature associated with a context). In some examples, lexical pipeline 144 is configured to detect keywords (e.g., according to a keyword whitelist) and/or lexical patterns (e.g., ordered sequences of words or patterns according to a formal grammar such as a regular expression grammar or a context-free grammar). In some examples, lexical pipeline 144 is configured to detect absence of keywords (e.g., keyword blacklist) and/or lexical patterns.

In some examples, lexical pipeline 144 is configured to assess a match confidence between the current context and the reference context based on similar lexical features being present in both contexts. In some examples, lexical pipeline 144 is configured to classify a current context based on lexical features. For example, when a current context is a query including the words "help," or similar lexical content related to assistance, lexical pipeline 144 is configured to classify the query as a help query. As used herein, "help query" includes any query to assist with discovering skills and/or configuring computerized personal assistant 101. In some examples, computerized personal assistant 101 is configured to perform a complementary help action associated with a skill responsive to recognizing a help query that may be related to the skill (e.g., a query having a high match confidence assessed by classifier pipeline 143 while also being recognized as a help query by lexical pipeline 144).

Classifier pipeline 143 and lexical pipeline 144 may cooperate to robustly assess matches between current contexts and reference contexts. Classifier pipeline 143 and lexical pipeline 144 may each assess a match confidence for a current context with regard to a reference context. In some examples, a match confidence assessed by classifier machine 141 may be based on match confidences output by classifier pipeline 143 and lexical pipeline 144 (e.g., a weighted sum of match confidences).

In some examples, classifier machine 141 may assess a match between the current context and each of a plurality of different reference contexts having varying match confidences indicating varying quality of match with the current context. Accordingly, classifier machine 141 is configured to assess, for each available skill of the plurality of available skills included in skills database 131, a candidate match confidence for the available skill. Classifier machine 141 may be further configured to rank the different reference contexts based on candidate match confidences, and to select a candidate skill having a highest candidate match confidence, at ranking 145. In this manner, classifier machine 141 may facilitate the discovery of a skill having a reference context that most closely matches a current context, even when multiple skills may match to varying extents. In some examples, classifier machine 141 may rank the different reference contexts based on a single match confidence value (e.g., based on a weighted sum of candidate match confidences assessed by classifier pipeline 143 and/or lexical pipeline 144). In some examples, classifier machine 141 may rank the different reference contexts based on a plurality of different values generated during the matching process. For example, the reference contexts may be ranked based on separate match confidences assessed by classifier pipeline 143 and/or lexical pipeline 144, based on a value assessed by one or more AI and/or ML models of classifier pipeline 143 (e.g., based on a value assessed by a hidden unit of a deep neural network model such as DSSM), and/or based on an individual rule applied by lexical classifier 144 (e.g., based on a match between the reference context and the current context with regard to a particular keyword).

In some examples, assessing a match confidence for a current context and a reference context is based on matching an intent of the current context to an intent of the reference context. In some examples, assessing a match confidence for a current context and a reference context is based on matching one or more constraints associated with the current context to one or more constraints associated with the reference context. For example, a current context and a reference context may have a relatively higher match confidence assessed when the two contexts each define the same constraint, and/or when the two contexts have one or more similar constraints.

Based on assessing a match confidence at classifier machine 141, a skill matching the current context may be selected in any suitable manner. For example, the skill may be selected based on having an associated reference context that has a relatively highest match confidence with the current context. In some examples, the skill may be selected at classifier machine 141. In some examples, the skill may be selected at skills database 131 and/or computerized personal assistant 101 based on the match confidence assessed by classifier machine 141 (e.g., classifier machine 141 may send, to skills database 131 and/or computerized personal assistant 101, one or more match confidence values associated with skills in skills database 131 for selection).

In some examples, computerized personal assistant 101 is configured to operate skill execution machine 106 in order to execute the instructions defining an assistive action of the candidate skill responsive to selection of the skill. In some examples, skill execution machine 106 is configured to only execute instructions defining an assistive action of the candidate skill when the match confidence for the skill exceeds a predefined match threshold confidence, e.g., so as to only perform operations that were highly likely to be intended by user 10. In some examples, skill execution machine 106 is configured to defer execution of instructions defining an assistive action of the candidate skill when the match confidence for the skill does not exceed the predefined match confidence threshold, e.g., so as to gather more information and/or ask user 10 a disambiguating question before executing the instructions. In some examples, skill execution machine 106 is configured to execute instructions defining a complementary help action associated with the skill instead of or in addition to executing the instructions defining the assistive action of the skill (e.g., when the match confidence does not exceed the predefined match confidence threshold).

Instructions may be executed at any of the computer devices in computing environment 100 of FIG. 1 (e.g., computerized personal assistant 101, network 111, personalization database 121, skills database 131, classifier machine 141, validation machine 151, cooperating computer service 161, and/or user device 171). In some examples, executing the instructions may include skills database 131 sending a command to computerized personal assistant 101 to execute further instructions configured to perform the assistive action and/or the complementary help action associated with a candidate skill. In some examples, executing the instructions may include computerized personal assistant 101 sending a command to cooperating computer service 161 to execute further instructions. More generally, an assistive action and/or a complementary help action may be defined by instructions that may be partially executed by any suitable combination of computer devices, thereby causing computing environment 100 and/or other cooperating computers to collectively provide the assistive action and/or the complementary help action.

Although exemplary computing environment 100 is described with regard to computerized personal assistant 101, the methods described in the present disclosure (e.g., method 200) may be enacted on any suitable computing device, e.g., a personal computing device or a cloud service instantiated on one or more network-accessible computing devices. As used herein, computerized personal assistant 101 generally refers to a local and/or remote set of computing devices configured to facilitate discovery of skills from skills database 131 and/or to answer queries by using a skill. In some examples, the computerized personal assistant 101 includes both 1) a local computing device that includes input devices (e.g., keyboard, microphone, camera) and output devices (e.g., display, speaker) for interacting with a user, and 2) a cooperating remote computer device (e.g., cloud computing device) configured to facilitate discovery of skills from skills database 131, and/or answer queries using a skill. In some examples, one or more components of exemplary computing environment 100 may be included in a common enclosure, e.g., as components of computerized personal assistant 101. For example, computerized personal assistant 101 may be implemented as an all-in-one computing device include components providing functionality of personalization database 121, skills database 131, classifier machine 141, and validation machine 151. In some examples, computerized personal assistant 101 may further provide functionality of one or more cooperating computer service, e.g., cooperating computer service 161. In some examples, computerized personal assistant 101 may be implemented as an application program configured for execution on user device 171.

Computerized personal assistant 101 may encounter many different current contexts of user 10. For example, computerized personal assistant 101 may receive many different queries from user 10. Moreover, queries received from user 10 may vary in lexical form and may express many different intents of user 10 and/or constraints related to the different intents. As such, there may be many different ways to issue a query to computerized personal assistant 101. Furthermore, in some cases, a query can be served by immediately using a skill to assist user 10, whereas in other cases more information may be required before computerized personal assistant 101 can use a skill to assist user 10 with regard to the query. Similarly, there may be many different activity contexts of user 10. In some cases, using a skill may be appropriate given a particular activity context, but in other cases a skill may be only partially relevant to the activity context or more information may be required before computerized personal assistant can use the skill to assist user 10 with regard to the activity context.

Figure 2:
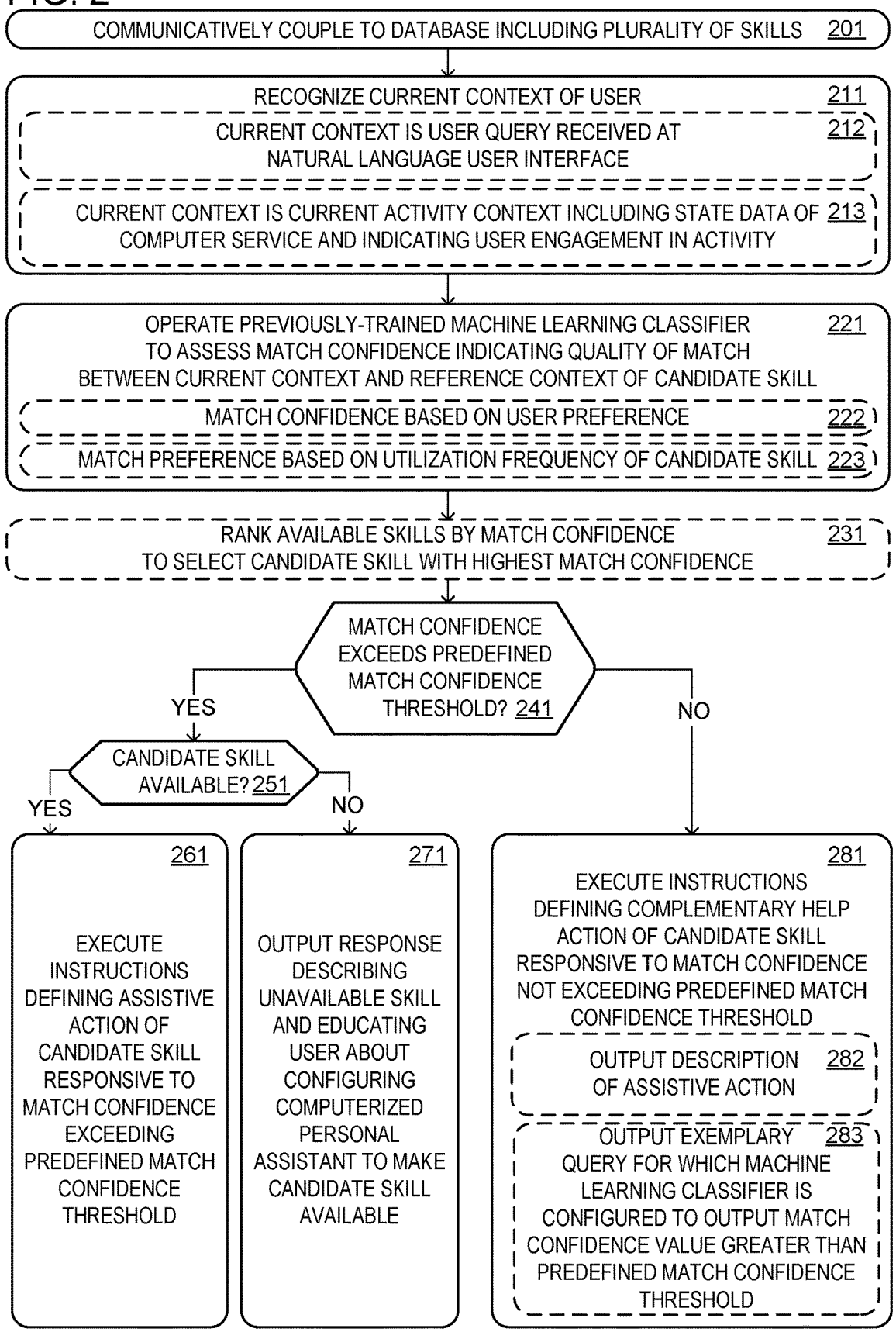
FIG. 2 shows a method for facilitating discovery of skills of a computerized personal assistant.

Accordingly, FIG. 2 depicts a method 200 for facilitating discovery of a skill of a computerized personal assistant, e.g., computerized personal assistant 101. In some examples, computerized personal assistant 101 may perform method 200 in order to expose a relevant skill based on a current context of user 10 thereby helping user 10 to learn what skills are available for computerized personal assistant 101 and to learn how to use the available skills. For example, computerized personal assistant 101 may perform method 200 in order to expose a relevant skill during conversation with user 10, based on a current context of user 10 (e.g., a current context defined by a query posed by user 10 during the conversation).

At 201, method 200 includes communicatively coupling computerized personal assistant 101 to a computer database including a plurality of available skills for computerized personal assistant 101, e.g., skills database 131.

At 211, method 200 includes recognizing a current context of a user, e.g., user 10. Optionally, in some examples, at 212, the current context of user 10 includes a user query received at a NLUI, e.g., at NLUI 102. For example, as shown in FIG. 1 at 11, user 10 issues a query asking if computerized personal assistant 101 can "play '70s music."

At 221, method 200 includes operating a previously-trained machine learning classifier to assess a match confidence, the match confidence indicating a quality of match between the current context and a reference context of the candidate skill. Accordingly, in order to facilitate discovery of a candidate skill pertaining to the user query at 11, computerized personal assistant 101 and/or skill discovery machine 105 may operate previously-trained machine learning classifier 141 to assess a match confidence for the candidate skill, and/or to assess match confidences for a plurality of candidate skills in order to select the candidate skill from among the plurality of candidate skills.

In some examples, assessing the match confidence for the candidate skill is based on assessing a match confidence for the current context with regard to a reference context of the candidate skill. In some examples, the reference context may include a seed query defined by an exemplary natural language sentence. Accordingly, the assistive action and the associated operation to assist the user may pertain to the seed query. For example, the candidate skill may be a skill having an assistive action for playing music using a streaming music service. Accordingly, a seed query associated with the candidate skill may be the query, "Play music by 'The Beatles'," e.g., a query expressing an intent to play music and a constraint that the music artist should be 'The Beatles.' Accordingly, the operation to assist the user may include playing music by 'The Beatles' using the streaming music service.

At 241, method 200 includes determining whether the match confidence exceeds a predefined threshold. The predefined threshold may be defined in any suitable manner. For example, the predefined threshold may be defined based on assessing an accuracy, precision, and/or recall of the previously trained machine learning classifier with regard to labelled training data (e.g., supervised training and/or cross-validation using the labelled training data).

At 281 and as depicted in FIG. 1, the match confidence does not exceed the predefined threshold. For example, a match confidence assessed for the current query "Can you play '70s music?" with regard to a seed query "Play music by 'The Beatles'" may not exceed the predefined threshold due to a difference in form/phrasing of the questions. Alternately or additionally, the match confidence may not exceed the predefined threshold due to constraints of the queries, e.g., the seed query has a constraint pertaining to a music artist, whereas the current query has a constraint about an era of music, which may not be useable for specifying music to stream using the streaming music service. Accordingly, at 281, method 200 includes executing instructions defining a complementary help action of the candidate skill, responsive to the match confidence not exceeding the predefined match confidence threshold. As shown in FIG. 1, computerized personal assistant 101 outputs a predefined response at 12 to educate user 10.

Optionally, at 282 and as shown in FIG. 1, outputting the predefined response to educate the user about the assistive action may include outputting a natural language description of the assistive action, e.g., computerized personal assistant 101 can play music if given a genre, artist, or song name.

Optionally, at 283 and as shown in FIG. 1, outputting the predefined response may include outputting an exemplary query for which the machine learning classifier is configured to output a match confidence value greater than the predefined match confidence threshold, so that the computerized personal assistant 101 is configured to perform the operation associated with the candidate skill to assist the user, responsive to receiving the exemplary query. For example, computerized personal assistant 101 is configured to respond to the query "Play rock music," by automatically playing rock music. In some examples, the exemplary query may be similar to a seed query or may be based on a seed query, e.g., "Play rock music" has a similar lexical form to the seed query "Play music by 'the Beatles'," and includes a genre constraint suitable for streaming music using the streaming music service.

After computerized personal assistant 101 outputs the predefined response to educate user 10 about how to use the skill for playing music, user 10 may continue the conversation by issuing another query. For example, at 13, user 10 issues another query saying that computerized personal assistant 101 should "play disco music." This new query is lexically similar to the exemplary query and includes a genre constraint similar to the exemplary query. Accordingly, computerized personal assistant 101 is configured to recognize the new context of the user based on the new query (e.g., according to method 200 at 211), to operate the previously-trained machine learning classifier to assess a match confidence for the new context and a reference context of a candidate skill (e.g., according to method 200 at 221), and to determine that the match confidence exceeds the predefined match confidence threshold (e.g., according to method 200 at 241).

At 251 method 200 includes determining whether the candidate skill is available. As shown in FIG. 1, the candidate skill for playing music is available, and accordingly, method 200 further includes, at 261, executing the instructions defining the assistive action of the candidate skill, responsive to the match confidence exceeding the predefined match confidence threshold. Accordingly, computerized personal assistant 101 acknowledges that music will begin playing at 14, thereby fulfilling the intent of the user's query.

Figure 3:
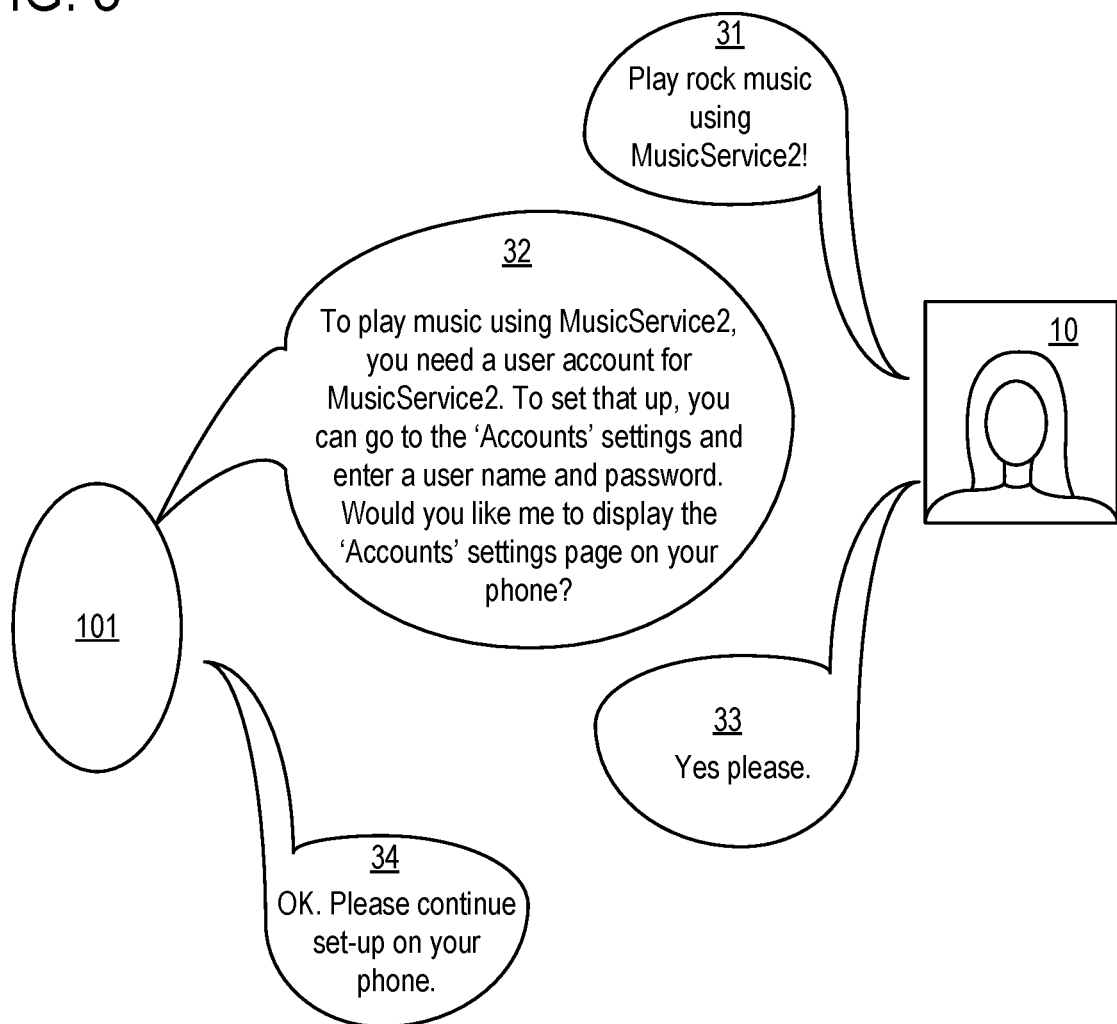
FIGS. 3-4 show exemplary conversations in which a computerized personal assistant facilitates discovery of a skill.

FIG. 3 shows a further example of computerized personal assistant 101 helping user 10 according to method 200. As shown in FIG. 3, computerized personal assistant 101 recognizes a current context of user 10 (e.g., according to method 200 at 211) based on a query at 31 in which the user asks the device to play rock music using a specific music service, "MusicService2." Accordingly, computerized personal assistant 101 is configured to operate the previously-trained machine learning classifier to assess a match confidence for a candidate skill, e.g., a skill for playing music using MusicService2.

In some examples, user 10 might ask to play a particular music track that is only available on a particular music service (e.g., songs from an artist and/or album that is distributed on the particular music service and not on other music services available to computerized personal assistant 101). Accordingly, computerized personal assistant 101 may infer a constraint implied by user 10's query, indicating that a music service making the music track available should be used for playing the music track. By inferring the music service to use for streaming music, computerized intelligent assistant 101 may alleviate a burden on user 10 to know and/or specify a service for playing the streaming content. Computerized personal assistant 101 may similarly infer and select an appropriate provider for any other kind of service (e.g., streaming movies and/or television services, food services, ride hailing services, etc.) based on constraint(s) implied by user 10's query. For example, computerized personal assistant 101 may infer and select a food service based on availability of a menu item user 10 is interested in ordering and/or based on a geographic coverage area of available food services. Similarly, computerized personal assistant 101 may infer and select a streaming movie service based on availability of a movie choice of user 10 within catalogs of movies offered by available streaming movie services.

Based on the query at 31, the previously-trained machine learning classifier may assess a relatively high match confidence for the candidate skill so that the match confidence exceeds the predefined match confidence threshold at 241. Accordingly, at 251, method 200 includes determining whether the candidate skill is available. However, the candidate skill may be unavailable because user 10 has not previously configured a user account for MusicService2.

At 271, method 200 includes, responsive to the match confidence for the unavailable skill exceeding the predefined match confidence threshold, outputting a predefined response describing the unavailable skill and educating the user about configuring computerized personal assistant 101 to cause the unavailable skill to become available. Accordingly, as shown in FIG. 3, computerized personal assistant 101 is configured to output a predefined response previously associated with the skill (e.g., when the skill was added to skills database 131). For example, at 32, computerized personal assistant 101 outputs a predefined response describing how music may be played using MusicService2, indicating that first a user account for MusicService2 is required, and describing how to set up the user account. In the example, computerized personal assistant 101 is further configured to offer to display, on the user's phone (e.g., user device 171) an 'Accounts' settings page for configuring the account for MusicService2. Accordingly, at 33, user 10 accepts this offer and at 34, computerized personal assistant 101 acknowledges that user 10 can continue the set-up process on their phone. In this manner, although the candidate skill for playing music with MusicService2 may have been initially unavailable, computerized personal assistant 101 may facilitate discovery and usage of the candidate skill by guiding the user 10 through a configuration process to make the candidate skill available.

Figure 4:
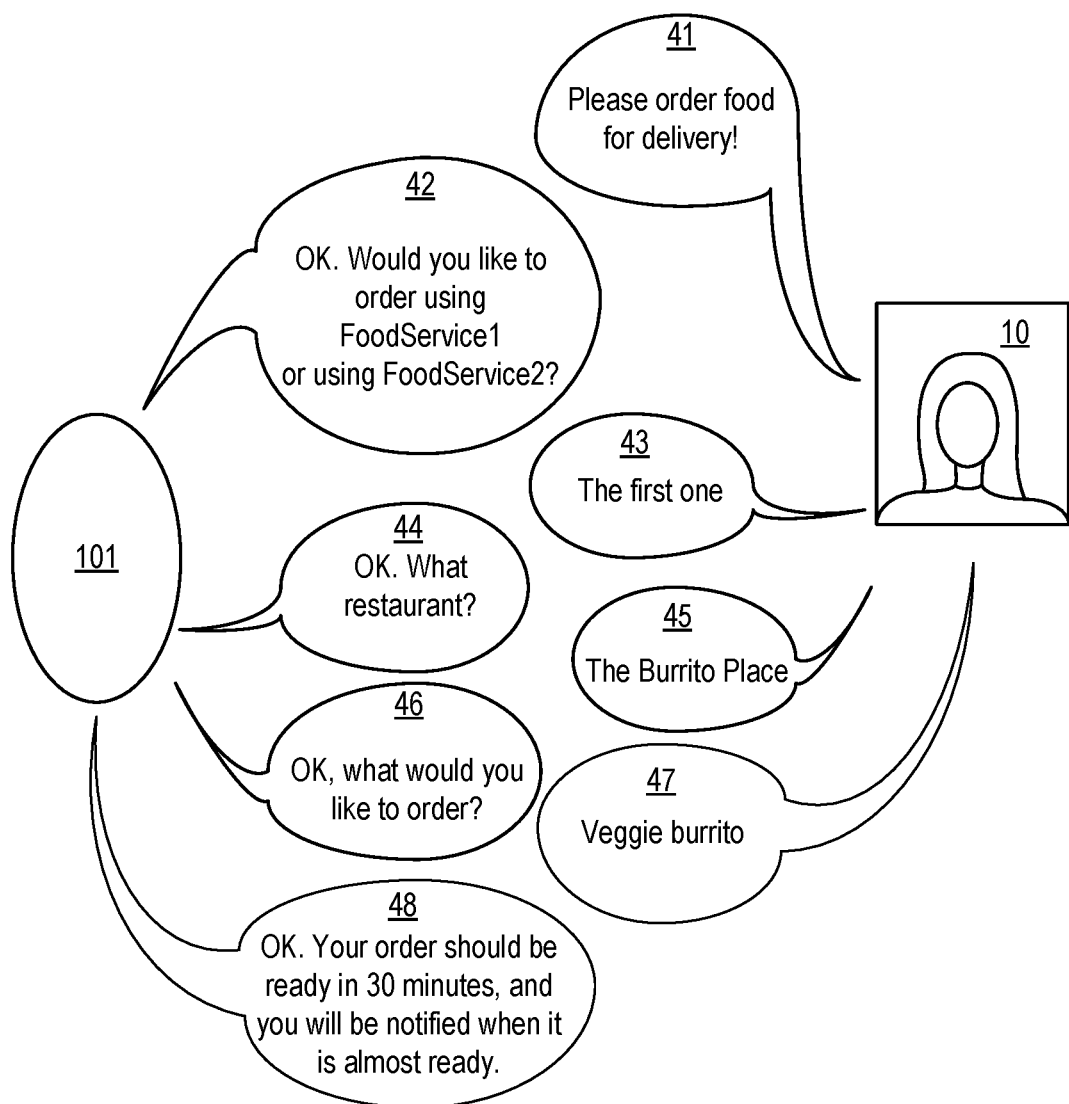

FIG. 4 shows a further example of a conversation between computerized personal assistant 101 and user 10 in which computerized personal assistant 101 facilitates the discovery of a skill according to method 200. As shown in FIG. 4, at 41, user 10 asks computerized personal assistant 101 to order food for delivery. Computerized personal assistant 101 may recognize a relatively high match confidence for each of two different skills for ordering food, using either "FoodService1" or "FoodService2." However, the match confidence for each of the two different skills may be below the predefined threshold (e.g., even when the user's intent to order food is recognized, the user's query may not have a sufficiently high match with either of the two skills, because the user's query does not sufficiently define constraints such as which particular skill/food service to use).

Computerized personal assistant 101 is configured to perform a complementary help action, wherein the complementary help action defines a disambiguating question. Accordingly, computerized personal assistant 101 may output, via NLUI 102, the disambiguating question, by asking whether to use FoodService1 or FoodService2 at 42. Computerized personal assistant 101 is further configured to receive, via NLUI 102, an answer to the disambiguating question, e.g., user 10's answer at 43. Computerized personal assistant 101 is configured to interpret the answer to the disambiguating question based on conversational history with user 10, e.g., by interpreting user 10's reply "the first one" to indicate the first option provided at 42, namely FoodService1. Accordingly, computerized personal assistant 101 may recognize a new context based on the conversation history with user 10, wherein the new context indicates that user 10 intends to order food using FoodService1 in particular.

Even after user 10 says to use FoodService1 at 43, a new match confidence for the current context with regard to a reference context of a candidate skill may not exceed the predefined match confidence threshold. For example, even when the user's intent to order food using FoodService1 is recognized, the user's query may not have a sufficiently high match with a skill for ordering food using FoodService1, because the user's query does not sufficiently define constraints such as what restaurant to order from and/or what menu item to order. Accordingly, as shown at 44, 45, 46, and 47, computerized personal assistant 101 may pose further disambiguating questions to user 10 in order to recognize a new context, e.g., to recognize that user 10 intends to order food using FoodService1 and specifically intends to order a "veggie burrito" from "The Burrito Place." Accordingly, computerized personal assistant 101 is configured to output a response at 48 acknowledging that an order was placed.

More generally, computerized personal assistant 101 is configured to output a series of predefined responses to pose a series of disambiguating questions whenever a match confidence for a current context is insufficiently high to exceed the predefined match confidence threshold with regard to one or more reference contexts associated with available and/or unavailable skills. For example, computerized personal assistant 101 may pose disambiguating questions to determine a particular skill (e.g., when an intent of a user is recognized but more than one skill may be applicable for serving the intent, as shown in FIG. 4), and/or to determine constraints associated with the intent. In some examples, user 10 may ask computerized personal assistant 101 for additional options, e.g., if user 10 does not want to use FoodService1 or FoodService2, user 10 may ask if there are any other skills available for ordering food. Accordingly, computerized personal assistant 101 may provide further options when such options are available, e.g., by indicating that FoodService3 is another option. When no such further options are available, computerized personal assistant 101 is configured to provide a generic "fallback" response, e.g., to indicate that no further options are available for ordering food.

In some examples, computerized personal assistant 101 may automatically disambiguate a user intent based on a current context, in order to automatically determine what skill to use and/or to automatically determine constraints associated with the user intent.

In some examples, the current context of user 10 includes a user preference (e.g., a user preference stored in personalization database 121), and assessing the match confidence for a candidate skill includes assessing a higher match confidence for the candidate skill based on the assistive action of the candidate skill satisfying the user preference. For example, computerized personal assistant 101 may have previously recognized a preference of user 10 to user FoodService1 instead of FoodService2 when possible, e.g., based on a frequency of user 10 using FoodService1 or based on user 10 explicitly stating a preference for using FoodService1 in the future. Accordingly, computerized personal assistant may recognize that user 10 likely wishes to use FoodService1 and may assess a higher match confidence for a skill for using FoodService1 as compared to a skill for using FoodService2.

In some examples, the current context of the user 10 includes, for each available skill of the plurality of available skills in skills database 131, a utilization frequency indicating a degree of past utilization of the available skill by user 10. Computerized personal assistant 101 is configured to facilitate discovery of underutilized skills having a relatively lower utilization frequency. For example, user 10 may be unaware of such underutilized skills. Accordingly, computerized personal assistant 101 is configured to assess a higher match confidence for a candidate skill based on the candidate skill having a relatively lower utilization frequency, as compared to other skills.

Returning to FIG. 2, optionally, in some examples, at 213, the current context of user 10 is a current activity context including state data of a computer service (e.g., cooperating computer service 161). A candidate skill may have an associated reference context comprising a historical activity context including state data of a computer service (e.g., cooperating computer service 161), wherein the state data is associated with the recognized activity being engaged in by a historical user of the computer service, and wherein the operation to assist the user pertains to the recognized activity. A high quality match between the current activity context and the historical activity context may indicate that a current activity of user 10 is the recognized activity. Accordingly, as the operation to assist the user pertains to the recognized activity, computerized personal assistant 101 may utilize the skill to assist the user with the recognized activity.

In some examples, computerized personal assistant 101 may automatically and/or proactively execute instructions defining a complementary help action of a candidate skill, responsive to assessing a match confidence for the candidate skill. For example, if user 10 is at an airport, user device 171 may detect that user 10 is at the airport (e.g., based on a global positioning system (GPS) sensor included in the user device 171), and accordingly, a current context of user 10 recognized by computerized personal assistant 101 may include the fact that user 10 is at the airport. Skills database 131 may include a skill for providing travel assistance (e.g., by displaying itineraries, maps, and/or tickets as user 10 enters the airport and throughout travel). However, user 10 may not have discovered the skill for providing travel assistance. Accordingly, based on the current context and/or based on underutilization of the skill for providing travel assistance, computerized personal assistant 101 may proactively execute instructions to perform the complementary help action for the travel skill. For example, the complementary help action for the travel skill may include outputting a predefined response, at NLUI 102, educating the user 10 about the travel skill. More generally, based on recognizing that the travel skill may be applicable to the user 10's current context, computerized personal assistant 101 may provide any suitable notifications to user 10, e.g., by displaying information about the travel skill at a display of user device 171.

In some examples, a skill may be associated with more than one predefined response, e.g., a predefined response for proactively performing a complementary help action and a predefined response for performing a complementary help action responsive to a query. In an example, a predefined response for proactively educating a user about a travel skill may include a brief description of the travel skill for educating the user about the skill (e.g., in case the user did not yet know about the skill), while a predefined response for educating the user about the travel skill responsive to a query may include a more in-depth description of how to use the travel skill including an exemplary query (e.g., in case the user may already know about the skill but may benefit from additional in-depth information about the skill). More generally, a skill may be associated with any suitable number of predefined responses, e.g., pertaining to different contexts, queries, intents, and/or constraints relating to the skill.

Returning to FIG. 1, facilitating the discovery of skills may be continually improved by training classifier machine 141. For example, classifier machine 141 may be trained using supervised training with regard to labelled data, e.g., based on labelled pairs where a labelled pair includes an exemplary current context and an exemplary reference context, labelled to indicate a quality of match between the contexts.

Validation machine 151 is configured to validate the operation of classifier machine 141 with regard to historical contexts (e.g., historical queries and historical activity contexts). Validation machine 151 is configured to receive a training example context, which may be any suitable context, e.g., a historical context previously recognized by computerized personal assistant 101. For an available skill of the plurality of available skills included in skills database 131, validation machine 151 is configured to operate classifier machine 141 to assess a training confidence indicating a quality of match between the training example context and a training reference context previously associated with the available skill. In some cases, the training confidence may be close to a predefined match confidence threshold, while not exceeding the predefined match confidence threshold. Accordingly, the training confidence may indicate that the training example context and the training reference context are a "near match," wherein the available skill is likely to be at least partially relevant to the training example context.

In some cases of "near match" between a training example context and a reference context, classifier machine 141 would potentially assess a lower and/or higher match confidence for the training example context and the training reference context if more training data were provided to classifier machine 141. Accordingly, validation machine 151 is configured to bring the "near match" to the attention of a trainer (e.g., a user of computerized personal assistant 101) in order to receive, from the trainer, additional training data and/or feedback.

Validation machine 151 is configured to receive, from the trainer, a second training reference context different than the first training reference context, and to update the skills database 131 to associate the second training reference context with the assistive action of the available skill. In some examples, the second training reference context may be semantically and/or lexically similar to the training example context. Accordingly, based on the association between the available skill and the second training reference context, classifier machine 141 may assess a higher match confidence for the training example context with regard to the available skill.

Alternately or additionally, validation machine 151 is configured to receive, from the trainer, an indication that the training example context does in fact match the training reference context, and to train classifier 141 so that after training, classifier 141 is configured to assess an updated match confidence that does exceed the predefined match confidence threshold. Data received from the trainer may confirm whether an available skill is actually a good match for a training example context. Accordingly, by updating classifier machine 141 and/or skills database 131 based on such data, validation machine 151 may cause classifier machine 141 to more appropriately assess match confidence for example contexts that may be a "near match" for available skills, thereby facilitating the discovery of such skills when the example contexts occur.

Classifier machine 141 may determine the quality of match in any suitable fashion, e.g., using any suitable combination of state-of-the-art and/or future natural language processing (NLP), ML and/or AI techniques, as will be described further below. For example, classifier pipeline 143 may be implemented using any suitable combination of such techniques.

More generally, components of computing environment 100, including personalization database 121, skills database 131, validation engine 151, computerized personal assistant 101 in general (and NLUI 102, skill discovery machine 105, and skill execution machine 106 in particular) may be implemented using any suitable combination of state-of-the-art and/or future NLP, ML, and/or AI techniques. For example, components of computing environment 100 may process natural language inputs, make decisions and/or assess confidence values for decisions, and more generally perform any methods and processes disclosed herein using NLP, ML, and/or AI techniques.

Non-limiting examples of techniques that may be incorporated in an implementation of computing environment 100 include support vector machines, multi-layer neural networks, convolutional neural networks (e.g., including temporal convolutional neural networks for processing natural language sentences), word embedding models (e.g., GloVe or Word2Vec), recurrent neural networks (e.g., long short-term memory networks), associative memories (e.g., lookup tables, hash tables, Bloom Filters, Neural Turing Machine and/or Neural Random Access Memory), unsupervised spatial and/or clustering methods (e.g., nearest neighbor algorithms, topological data analysis, and/or k-means clustering) and/or graphical models (e.g., Markov models, conditional random fields, and/or AI knowledge bases).

In some examples, methods and processes performed by components of computing environment 100 (e.g., method 200) may be implemented using one or more differentiable functions, wherein a gradient of the differentiable functions may be calculated and/or estimated with regard to inputs and/or outputs of the differentiable functions (e.g., with regard to training data, and/or with regard to an objective function). Methods and processes of computing environment 100 may be at least partially determined by a set of trainable parameters of computing environment 100 (e.g., including trainable parameters for each component of computing environment 100). Accordingly, trainable parameters of computing environment 100 may be adjusted through any suitable training procedure, in order to continually improve functioning of the methods and processes described herein.

Non-limiting examples of training procedures include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback, such as feedback from user 10 regarding quality of assistance provided by computing assistant 101) and/or generative adversarial neural network training methods. In some examples, a plurality of components of computing environment 100 may be trained simultaneously with regard to an objective function measuring performance of collective functioning of the plurality of components (e.g., with regard to feedback from user 10 or with regard to labelled training data), in order to improve such collective functioning. In some examples, one or more components of computing environment 100 may be trained independently of other components (e.g., offline training with regard to historical data).

In some embodiments, the methods and processes described herein may be tied to a computing system of one or more computing devices. In particular, such methods and processes may be implemented as a computer-application program or service, an API, a library, and/or other computer-program product.

Figure 5:
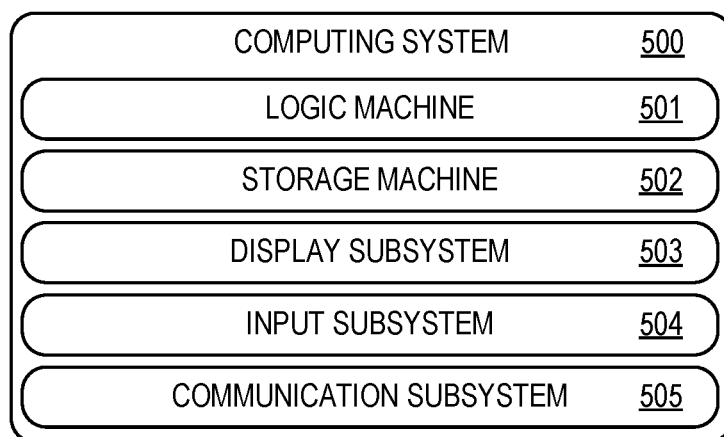
FIG. 5 shows an exemplary computing system.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices. For example, computing system 500 may be a computerized personal assistant 101. Alternately or additionally, computing system 500 may be a personalization database 121, a skills database 131, a classifier machine 141, a validation machine 151, a cooperating computer service 161, and/or a user device 171.

Computing system 500 includes a logic machine 501 and a storage machine 502. Computing system 500 may optionally include a display subsystem 503, input subsystem 504, communication subsystem 505, and/or other components not shown in FIG. 5.

Logic machine 501 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 502 includes one or more physical devices configured to hold instructions executable by the logic machine to implement the methods and processes described herein. When such methods and processes are implemented, the state of storage machine 502 may be transformed—e.g., to hold different data.

Storage machine 502 may include removable and/or built-in devices. Storage machine 502 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 502 may include volatile, nonvolatile, dynamic, static, read/write, read-only, random-access, sequential-access, location-addressable, file-addressable, and/or content-addressable devices.

It will be appreciated that storage machine 502 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 501 and storage machine 502 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 implemented to perform a particular function. In some cases, a module, program, or engine may be instantiated via logic machine 501 executing instructions held by storage machine 502. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 503 may be used to present a visual representation of data held by storage machine 502. This visual representation may take the form of a graphical user interface (GUI). As the herein described methods and processes change the data held by the storage machine, and thus transform the state of the storage machine, the state of display subsystem 503 may likewise be transformed to visually represent changes in the underlying data. Display subsystem 503 may include one or more display devices utilizing virtually any type of technology. Such display devices may be combined with logic machine 501 and/or storage machine 502 in a shared enclosure, or such display devices may be peripheral display devices.

When included, input subsystem 504 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 505 may be configured to communicatively couple computing system 500 with one or more other computing devices. Communication subsystem 505 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 500 to send and/or receive messages to and/or from other devices via a network such as the Internet.

In an example, a computerized personal assistant comprises: a natural language user interface (NLUI) including a microphone and a speaker; a skill discovery machine configured to communicatively couple to a computer database including a plurality of available skills for the computerized personal assistant, wherein the computer database defines, for a candidate skill: an assistive action defined by instructions executable by the computerized personal assistant to perform an operation to assist a user; a reference query previously associated with the assistive action; and a complementary help action previously associated with the assistive action, wherein the complementary help action is defined by instructions executable by the computerized personal assistant to output a predefined response to educate the user about the assistive action. In this example or any other example, the computerized personal assistant further comprises: a skill execution machine configured to: receive, from the NLUI, a current query captured by the microphone; responsive to receiving the current query, operate the skill discovery machine to assess a match confidence for the candidate skill, the match confidence indicating a quality of match between the current query and the reference query; execute the instructions defining the assistive action responsive to the match confidence exceeding a predefined match confidence threshold; and execute the instructions defining the complementary help action responsive to the match confidence not exceeding the predefined match confidence threshold, and output the predefined response via the speaker.

In an example, a method of facilitating the discovery of a skill of a computerized personal assistant comprises: communicatively coupling the computerized personal assistant to a computer database including a plurality of available skills for the computerized personal assistant, wherein the computer database defines, for a candidate skill: an assistive action defined by instructions executable by the computerized personal assistant to perform an operation to assist a user; a reference context previously associated with the assistive action; and a complementary help action previously associated with the assistive action, wherein the complementary help action is defined by instructions executable by the computerized personal assistant to output a predefined response to educate the user about the assistive action. In this example or any other example, the method further comprises: recognizing a current context of the user; operating a previously-trained machine learning classifier to assess a match confidence for the candidate skill, the match confidence indicating a quality of match between the current context and the reference context; executing the instructions defining the assistive action responsive to the match confidence exceeding a predefined match confidence threshold; and executing the instructions defining the complementary help action responsive to the match confidence not exceeding the predefined match confidence threshold. In this example or any other example, the reference context includes a seed query defined by an exemplary natural language sentence; the operation to assist the user pertains to the seed query; and the current context of the user includes a user query received via a natural language user interface. In this example or any other example, the reference context includes a historical activity context including state data of a computer service, the state data associated with a recognized activity of a historical user of the computer service; the operation to assist the user pertains to the recognized activity; and the current context of the user includes a current activity context including state data of the computer service, the state data indicating the user is using the computer service to engage in the recognized activity. In this example or any other example, executing the instructions defining the complementary help action of the candidate skill is performed proactively, responsive to assessing a match confidence for the candidate skill. In this example or any other example, the current context of the user includes a user preference; and assessing the match confidence includes assessing a higher match confidence for the candidate skill based on the assistive action satisfying the user preference. In this example or any other example, the current context of the user includes, for each available skill of the plurality of available skills, a utilization frequency indicating a degree of past utilization of the available skill by the user; and assessing the match confidence includes assessing a higher match confidence for the candidate skill based on the candidate skill having a relatively lower utilization frequency. In this example or any other example, the method further comprises: operating the previously-trained machine learning classifier to assess, for each available skill of the plurality of available skills, a candidate match confidence for the available skill; and ranking the plurality of available skills by candidate match confidence. In this example or any other example, the candidate skill is an available skill having a highest candidate match confidence. In this example or any other example, the computer database further includes an unavailable skill, and the method further comprises: operating the previously-trained machine learning classifier to assess an unavailable skill match confidence indicating a quality of match between the current context and a reference context previously associated with the unavailable skill; and responsive to the unavailable skill match confidence exceeding the predefined match confidence threshold, outputting a response describing the unavailable skill and educating the user about configuring the computerized personal assistant to cause the unavailable skill to become available. In this example or any other example, outputting the predefined response to educate the user about the assistive action includes outputting, via a NLUI, a natural language description of the assistive action. In this example or any other example, the predefined response to educate the user about the assistive action includes an exemplary query for which the previously-trained machine learning classifier is configured to output a match confidence value greater than the predefined match confidence threshold, so that the computerized personal assistant is configured to perform the operation to assist the user responsive to receiving the exemplary query. In this example or any other example, the complementary help action further defines a disambiguating question, and the method further comprises: outputting, via a natural language user interface (NLUI), the disambiguating question; receiving, via the NLUI, an answer to the disambiguating question; and responsive to receiving the answer, operating the computerized personal assistant to execute the instructions defining the assistive action of the candidate skill. In this example or any other example, the method further comprises: receiving a training example context; for an available skill of the plurality of available skills: operating the previously-trained machine learning classifier to assess a training confidence indicating a quality of match between the training example context and a first training reference context previously associated with the available skill, wherein the training confidence does not exceed the predefined match confidence threshold; receiving, from a trainer, a second training reference context; and updating the computer database to associate the second training reference context with the assistive action of the available skill. In this example or any other example, the method further comprises: receiving a training example context; for an available skill of the plurality of available skills: operating the previously-trained machine learning classifier to assess a training confidence indicating a quality of match between the training example context and a training reference context previously associated with the available skill, wherein the training confidence does not exceed the predefined match confidence threshold; receiving, from a trainer, an indication that the training example context matches the training reference context; and training the previously-trained machine learning classifier, so that a further-trained machine learning classifier is configured to assess an updated confidence, wherein the updated confidence exceeds the predefined match confidence threshold.

In an example, a computer system comprises: a logic machine; and a storage machine holding instructions executable by the logic machine to: communicatively couple to a computer database including a plurality of available skills for the computer system, wherein the computer database defines, for a candidate skill: an assistive action defined by instructions executable by the computerized personal assistant to perform an operation to assist a user; a reference context previously associated with the assistive action; and a complementary help action previously associated with the assistive action, wherein the complementary help action is defined by instructions executable by the computerized personal assistant to output a predefined response to educate the user about the assistive action. In this example or any other example, the instructions are further executable to: recognize a current context of the user; operate a previously-trained machine learning classifier to assess a match confidence for the candidate skill, the match confidence indicating a quality of match between the current context and the reference context; perform the assistive action responsive to the match confidence exceeding a predefined match confidence threshold; and perform the complementary help action responsive to the match confidence not exceeding the predefined match confidence threshold. In this example or any other example, the reference context includes a seed query defined by an exemplary natural language sentence; the operation to assist the user pertains to the seed query; and the current context of the user includes a user query received via a natural language user interface. In this example or any other example, the reference context includes a historical activity context including state data of a computer service, the state data associated with a recognized activity of a historical user of the computer service; the operation to assist the user pertains to the recognized activity; and the current context of the user includes a current activity context including state data of the computer service, the state data indicating the user is using the computer service to engage in the recognized activity. In this example or any other example, the complementary help action of the candidate skill is performed proactively, responsive to assessing a match confidence for the candidate skill. In this example or any other example, the current context of the user includes a user preference; and assessing the match confidence includes assessing a higher match confidence for the candidate skill based on the assistive action satisfying the user preference. In this example or any other example, the current context of the user includes, for each available skill of the plurality of available skills, a utilization frequency indicating a degree of past utilization of the available skill by the user; and assessing the match confidence includes assessing a higher match confidence for the candidate skill based on the candidate skill having a relatively lower utilization frequency.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computerized personal assistant, comprising:
   a natural language user interface (NLUI) including a microphone and a speaker;
   a skill discovery machine configured to communicatively couple to a computer database including a plurality of available skills for the computerized personal assistant, wherein the computer database defines, for a candidate skill:
      an assistive action defined by instructions executable by the computerized personal assistant to perform an operation to assist a user;
      a reference query previously associated with the assistive action; and
      a complementary help action previously associated with the assistive action, wherein the complementary help action is defined by instructions executable by the computerized personal assistant to output a predefined response to educate the user about the assistive action; and
   a skill execution machine configured to:
      receive, from the NLUI, a current query captured by the microphone;
      responsive to receiving the current query, operate the skill discovery machine to assess a match confidence for the candidate skill, the match confidence indicating a quality of match between the current query and the reference query, including assessing a higher match confidence for the candidate skill based on the candidate skill having a relatively lower utilization frequency by the user, compared to other available skills of the plurality of available skills;
      execute the instructions defining the assistive action responsive to the match confidence exceeding a predefined match confidence threshold; and
      execute the instructions defining the complementary help action responsive to the match confidence not exceeding the predefined match confidence threshold, and output the predefined response via the speaker.

2. A method of facilitating the discovery of a skill of a computerized personal assistant, the method comprising:
   communicatively coupling the computerized personal assistant to a computer database including a plurality of available skills for the computerized personal assistant, wherein the computer database defines, for a candidate skill:
      an assistive action defined by instructions executable by the computerized personal assistant to perform an operation to assist a user;
      a reference context previously associated with the assistive action; and
      a complementary help action previously associated with the assistive action, wherein the complementary help action is defined by instructions executable by the computerized personal assistant to output a predefined response to educate the user about the assistive action;
   recognizing a current context of the user;
   operating a previously-trained machine learning classifier to assess a match confidence for the candidate skill, the match confidence indicating a quality of match between the current context and the reference context, including assessing a higher match confidence for the candidate skill based on the candidate skill having a relatively lower utilization frequency by the user, compared to other available skills of the plurality of available skills;
executing the instructions defining the assistive action responsive to the match confidence exceeding a predefined match confidence threshold; and
executing the instructions defining the complementary help action responsive to the match confidence not exceeding the predefined match confidence threshold.

3. The method of claim 2, wherein:
the reference context includes a seed query defined by an exemplary natural language sentence;
the operation to assist the user pertains to the seed query; and
the current context of the user includes a user query received via a natural language user interface.

4. The method of claim 2, wherein:
the reference context includes a historical activity context including state data of a computer service, the state data associated with a recognized activity of a historical user of the computer service;
the operation to assist the user pertains to the recognized activity; and
the current context of the user includes a current activity context including state data of the computer service, the state data indicating the user is using the computer service to engage in the recognized activity.

5. The method of claim 2, wherein executing the instructions defining the complementary help action of the candidate skill is performed proactively, responsive to assessing a match confidence for the candidate skill.

6. The method of claim 2, wherein:
the current context of the user includes a user preference; and assessing the match confidence includes assessing a higher match confidence for the candidate skill based on the assistive action satisfying the user preference.

7. The method of claim 2, wherein:
the current context of the user includes, for each available skill of the plurality of available skills, a utilization frequency indicating a degree of past utilization of the available skill by the user; and
assessing the match confidence includes assessing a higher match confidence for the candidate skill based on the candidate skill having a relatively lower utilization frequency.

8. The method of claim 2, the method further comprising:
operating the previously-trained machine learning classifier to assess, for each available skill of the plurality of available skills, a candidate match confidence for the available skill;
ranking the plurality of available skills by candidate match confidence; and
wherein the candidate skill is an available skill having a highest candidate match confidence.

9. The method of claim 2, wherein the computer database further includes an unavailable skill, the method further comprising:
operating the previously-trained machine learning classifier to assess an unavailable skill match confidence indicating a quality of match between the current context and a reference context previously associated with the unavailable skill; and
responsive to the unavailable skill match confidence exceeding the predefined match confidence threshold, outputting a response describing the unavailable skill and educating the user about configuring the computerized personal assistant to cause the unavailable skill to become available.

10. The method of claim 2, wherein outputting the predefined response to educate the user about the assistive action includes outputting, via a NLUI, a natural language description of the assistive action.

11. The method of claim 2, wherein the predefined response to educate the user about the assistive action includes an exemplary query for which the previously-trained machine learning classifier is configured to output a match confidence value greater than the predefined match confidence threshold, so that the computerized personal assistant is configured to perform the operation to assist the user responsive to receiving the exemplary query.

12. The method of claim 2, wherein the complementary help action further defines a disambiguating question, the method further comprising:
outputting, via a natural language user interface (NLUI), the disambiguating question;
receiving, via the NLUI, an answer to the disambiguating question; and
responsive to receiving the answer, operating the computerized personal assistant to execute the instructions defining the assistive action of the candidate skill.

13. The method of claim 2, further comprising:
receiving a training example context;
for an available skill of the plurality of available skills:
operating the previously-trained machine learning classifier to assess a training confidence indicating a quality of match between the training example context and a first training reference context previously associated with the available skill, wherein the training confidence does not exceed the predefined match confidence threshold;
receiving, from a trainer, a second training reference context; and
updating the computer database to associate the second training reference context with the assistive action of the available skill.

14. The method of claim 2, further comprising:
receiving a training example context;
for an available skill of the plurality of available skills:
operating the previously-trained machine learning classifier to assess a training confidence indicating a quality of match between the training example context and a training reference context previously associated with the available skill, wherein the training confidence does not exceed the predefined match confidence threshold;
receiving, from a trainer, an indication that the training example context matches the training reference context; and
training the previously-trained machine learning classifier, so that a further-trained machine learning classifier is configured to assess an updated confidence, wherein the updated confidence exceeds the predefined match confidence threshold.

15. A computer system, comprising:
a logic machine; and
a storage machine holding instructions executable by the logic machine to:
communicatively couple to a computer database including a plurality of available skills for the computer system, wherein the computer database defines, for a candidate skill:

an assistive action defined by instructions executable by the computerized personal assistant to perform an operation to assist a user;

a reference context previously associated with the assistive action; and a complementary help action previously associated with the assistive action, wherein the complementary help action is defined by instructions executable by the computerized personal assistant to output a predefined response to educate the user about the assistive action;

recognize a current context of the user;

operate a previously-trained machine learning classifier to assess a match confidence for the candidate skill, the match confidence indicating a quality of match between the current context and the reference context, including assessing a higher match confidence for the candidate skill based on the candidate skill having a relatively lower utilization frequency by the user, compared to other available skills of the plurality of available skills;

perform the assistive action responsive to the match confidence exceeding a predefined match confidence threshold; and perform the complementary help action responsive to the match confidence not exceeding the predefined match confidence threshold.

16. The computer system of claim 15, wherein:

the reference context includes a seed query defined by an exemplary natural language sentence;

the operation to assist the user pertains to the seed query; and the current context of the user includes a user query received via a natural language user interface.

17. The computer system of claim 15, wherein:

the reference context includes a historical activity context including state data of a computer service, the state data associated with a recognized activity of a historical user of the computer service;

the operation to assist the user pertains to the recognized activity; and the current context of the user includes a current activity context including state data of the computer service, the state data indicating the user is using the computer service to engage in the recognized activity.

18. The computer system of claim 15, wherein the complementary help action of the candidate skill is performed proactively, responsive to assessing a match confidence for the candidate skill.

19. The computer system of claim 15, wherein:

the current context of the user includes a user preference; and assessing the match confidence includes assessing a higher match confidence for the candidate skill based on the assistive action satisfying the user preference.

20. The computer system of claim 15, wherein:

the current context of the user includes, for each available skill of the plurality of available skills, a utilization frequency indicating a degree of past utilization of the available skill by the user.

* * * * *